May 12, 1925.
J. A. BURGERS
MEAT SLICING MACHINE
Filed March 5, 1924
1,537,746
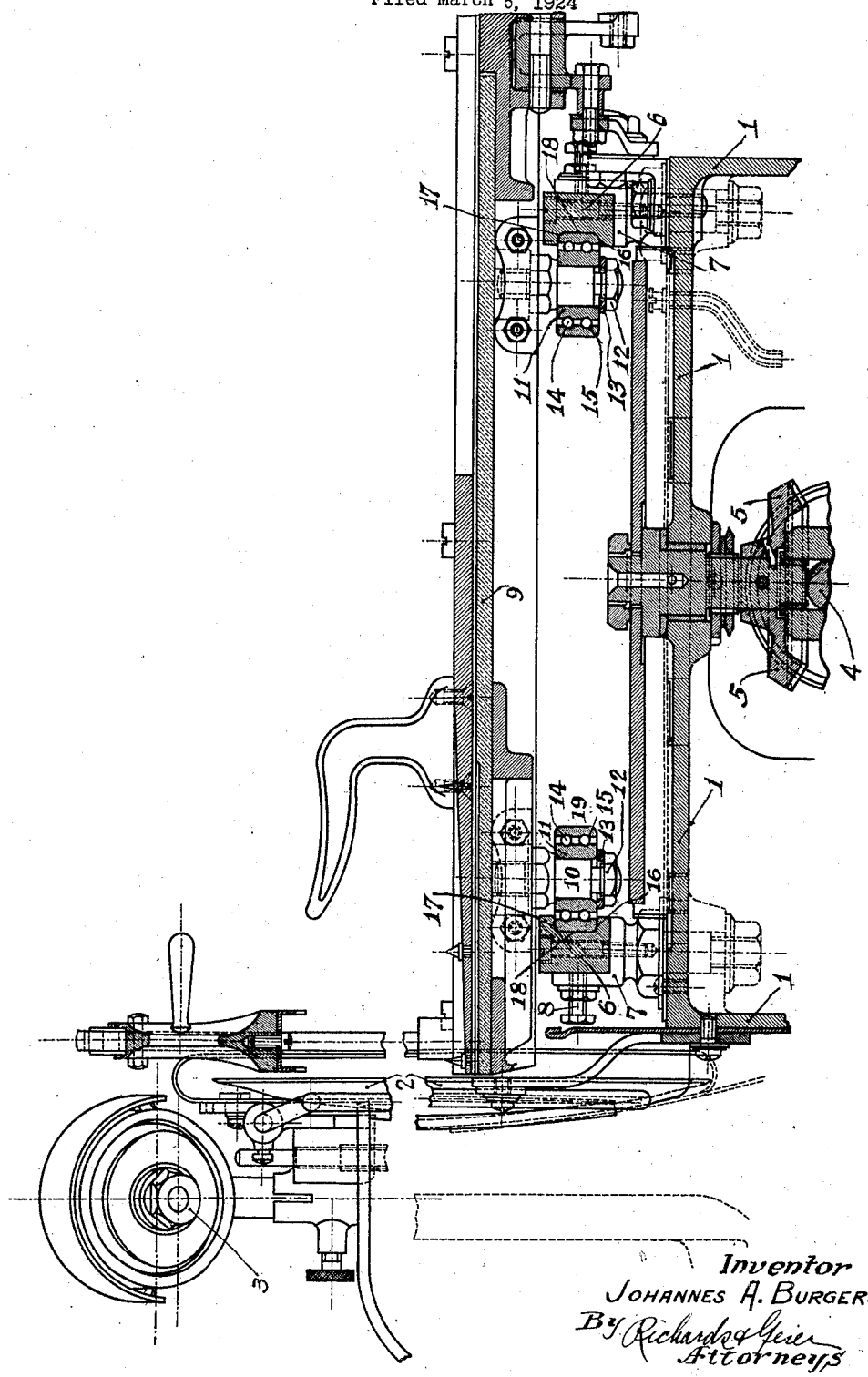
Inventor
JOHANNES A. BURGERS
By Richards & Geier
Attorneys Patented May 12, 1925.

1,537,746

UNITED STATES PATENT OFFICE.

JOHANNES ANTONIUS BURGERS, OF DEVENTER, NETHERLANDS, ASSIGNOR TO NAAMLOOZE VENNOOTSCHAP NEDERLANDSCHE ONDERDEELEN CORPORATIE, OF DEVENTER, NETHERLANDS.

MEAT-SLICING MACHINE.

Application filed March 5, 1924. Serial No. 697,071.

*To all whom it may concern:*

Be it known that I, JOHANNES ANTONIUS BURGERS, a subject of the Queen of the Netherlands, residing at Deventer, in the Kingdom of the Netherlands, Broederenstraat 42, have invented new and useful Improvements in and Relating to Meat-Slicing Machines, of which the following is a specification.

This invention relates to meat slicing machines and more particularly to the mechanism for moving the machine table.

In known meat slicing machines the table is generally driven by a crank mechanism, the rotating movement of the main shaft being converted into straight line reciprocating movement of the table, the table sliding for travelling over a fixed table support.

This type of drive and movement have the disadvantage that very great frictional resistances are produced and in consequence wear occurs which prevents and destroys the noiseless working of the machine.

The present invention is designed to avoid these and the like difficulties by specially arranged supporting means for the moving table. This is effected by the means employed so that the pressure exercised by the table is taken up in all directions by guide surfaces arranged on the fixed support.

These means consist in arranging rotary members on the said guide surfaces or guide members. The invention is further characterized by the feature that the said guides or guide ribs enclose the rotary members on one side.

Such a rotary member consists of a one- or more-row ball bearing arranged on the under side of the moving table.

In a convenient construction according to the invention the inner races of the ball bearings are fixed to the reciprocating table whilst the outer races slide in the guides or guide ribs.

For the purpose of removing the outer races of the ball bearings the said guide ribs are U-shaped or so shaped that they can enclose the outer races.

Finally the invention is further characterized by making the guide ribs adjustable so that the deterioration effects of wear can be avoided.

By way of example a vertical section of a meat slicing machine embodying the invention is shown in the accompanying drawing.

1 indicates the machine frame on which is arranged in the ordinary way the circular knife 2 together with the corresponding grinding mechanism 3.

4 is the main driving draft of the machine which operates the mechanism for reciprocating the table in known manner through the bevel gear 5.

The machine support situated below the table is provided with guide ribs 6, in which the guide members of the table move. These guide members rest on supports 7 and are adjustable horizontally by screws 8.

The guide ribs 6 are, as already mentioned, so formed being for instance U-shaped, that they can enclose the rotary members of the table which may be for example ball bearings 19.

The table 9 is provided on its under side with a number, for instance, four bolts 10 onto which the ball bearings are fitted, the inner races 11 of which are fastened to the bolt by a nut 12 and washer 13. By this means the inner races of the ball bearing form a solid assembly with the table 9. The outer races 15 of the ball bearings, which are shown with two rows in the drawing but can also be made with one row, engage and run in the grooves of the guide ribs 6 being thus enclosed on three sides by the said ribs 6 which are fixed to the machine.

By this arrangement the undersides 16 of the grooves in the guide ribs 6 take the downward vertical pressure whilst the upper sides 17 of the guide grooves take upwardly directed vertical pressure and the side walls 18 take the horizontal pressure.

In this way the pressure is satisfactorily distributed and in consequence the machine works extremely silently.

As a result of the horizontal arrangement of the ball bearing it further follows that the table is supported on a plurality of bearing surfaces and furthermore by the employment of double-row ball bearings, the number of bearing surfaces is double the number of ball bearings. Naturally therefore friction and consequential wear are much reduced.

Having now particularly described and ascertained the nature of my said invention and in what manner the same is to be performed, I declare that what I claim is:—

1. A meat slicing machine including a reciprocating table, a fixed support therefor, guide members on said support, and rotary members carried by said table and each including a plurality of rows of horizontally arranged ball bearings, said rotary members being engaged with said guide members so that the latter will take up pressure on all sides of said rotary members.

2. A meat slicing machine including a reciprocating table, a fixed support therefor, guide members carried by said support and including guide ribs, and a plurality of rotary members associated with said guide members, each rotary member including inner ball bearing races connected to said reciprocating table and outer ball bearing races engageable between the guide ribs of said guide members.

3. A meat slicing machine including a reciprocating table, a fixed support therefor, guide members carried by said support and including guide ribs, rotary members carried by said reciprocating table, and each including a plurality of rows of horizontally arranged ball bearings, inner races for said ball bearings connected to the reciprocating table, and outer races for the ball bearings disposed between the ribs of said guide members.

4. A meat slicing machine including a reciprocating table, a fixed support therefor, guide members carried by said support and including guide ribs, rotary members carried by said reciprocating table, and each including a plurality of rows of horizontally arranged ball bearings, inner races for said ball bearings connected to the reciprocating table, and outer races for the ball bearings disposed between the ribs of said guide members, said guide ribs being of U shaped formation for receiving the outer races of said rotary members.

5. A meat slicing machine including a reciprocating table, a fixed support therefor, guide members carried by said support, rotary members supported by said reciprocating table and engageable in said guide members, and means for adjusting said guide members.

6. A meat slicing machine including a reciprocating table, a fixed support therefor, guide members carried by said support and including guide ribs, rotary members carried by said reciprocating table and each including a plurality of rows of horizontally arranged ball bearings, inner races for said ball bearings connected to the reciprocating table, outer races for the ball bearings disposed between the ribs of said guide members, and means for adjusting said guide ribs toward and away from said rotary members.

In testimony whereof I have signed my name to this specification.

JOHANNES ANTONIUS BURGERS.

Witnesses:
 F. MAUS ERLIK,
 CL. BROUWER.